United States Patent
Cosby et al.

(10) Patent No.: US 10,445,280 B2
(45) Date of Patent: Oct. 15, 2019

(54) PCIE SWITCH FOR AGGREGATING A LARGE NUMBER OF ENDPOINT DEVICES

(71) Applicant: Lenovo Enterprise Solutions (Singapore) Pte. Ltd., Singapore (SG)

(72) Inventors: David W. Cosby, Raleigh, NC (US); Jonathan R. Hinkle, Raleigh, NC (US); Theodore B. Vojnovich, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 205 days.

(21) Appl. No.: 15/291,414

(22) Filed: Oct. 12, 2016

(65) Prior Publication Data
US 2018/0101498 A1    Apr. 12, 2018

(51) Int. Cl.
*G06F 13/40*   (2006.01)
*G06F 13/42*   (2006.01)

(52) U.S. Cl.
CPC ...... *G06F 13/4068* (2013.01); *G06F 13/4282* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 8,694,709 | B2 * | 4/2014 | Loffink | H01R 13/70 |
|---|---|---|---|---|
| | | | | 361/679.33 |
| 9,037,786 | B2 * | 5/2015 | Asnaashari | G06F 12/0246 |
| | | | | 711/103 |
| 2007/0097948 | A1 * | 5/2007 | Boyd | G06F 13/4004 |
| | | | | 370/351 |

(Continued)

OTHER PUBLICATIONS xillybus.com, "Down to the TLP: How PCI express devices talk (Part I)", http://xillybus.com/tutorials/pci-express-tlp-pcie-primer-tutorial-guide-1, 2010 (This document only identifies the year of publication (without the month), but the year of publication is sufficiently earlier than the effective U.S. filing date and any foreign priority date so that the particular month of publication is not in issue. See MPEP 609.04(a)). 8 pages.

*Primary Examiner* — Henry Tsai
*Assistant Examiner* — Aurangzeb Hassan
(74) *Attorney, Agent, or Firm* — Jeffrey L. Streets

(57) ABSTRACT

An apparatus includes a root port for coupling to a root complex, and a plurality of endpoint ports for coupling to endpoint devices, wherein each endpoint port is associated with a function number. A downstream buffer queues transaction layer packets (TLPs) received from the root port, wherein each TLP in the downstream buffer is directed to an endpoint port associated with the identified function number. An upstream buffer queues TLPs received from each endpoint port, and directs the queued TLPs to the root port. A method includes associating a function number with each endpoint port of a switch, wherein each endpoint port is (Continued)

adapted for coupling to an endpoint device. The method further includes receiving a first TLP from a root complex, identifying a function number within the first TLP, and directing the first TLP to an endpoint device through the endpoint port associated with the identified function number.

20 Claims, 4 Drawing Sheets

(56) References Cited

U.S. PATENT DOCUMENTS

| | | | | |
|---|---|---|---|---|
| 2008/0147959 | A1* | 6/2008 | Freimuth | G06F 12/1009 711/100 |
| 2010/0254100 | A1* | 10/2010 | Kim | H05K 7/1461 361/752 |
| 2011/0264833 | A1* | 10/2011 | Zhang | G06F 3/0626 710/74 |
| 2014/0047156 | A1* | 2/2014 | Billi | G06F 13/4022 710/314 |
| 2015/0186319 | A1* | 7/2015 | Blevins | G06F 13/20 710/301 |
| 2015/0236700 | A1* | 8/2015 | Townley | G06F 1/06 326/38 |

* cited by examiner

PCIE SWITCH FOR AGGREGATING A LARGE NUMBER OF ENDPOINT DEVICES

BACKGROUND

Field of the Invention

The present invention relates to switches for connecting multiple endpoint devices to a root complex.

Background of the Related Art

Peripheral Component Interconnect Express (PCIe) is a high-speed serial computer expansion bus standard that is often used as a digital interface between a root complex and one or more endpoint devices. Examples of an endpoint device include an input output adapter, non-volatile memory flash drive, and other types of data storage devices.

In order to connect all the desired endpoint devices to a computing system, a PCIe interconnect may be expanded through the use of one or more PCIe switches. Each PCIe switch includes a rich set of functions, some of which are tailored to the types of endpoint devices, such as storage features for NVMe Flash drives, that are connected to the switch. While each of these functions are valuable in specific situations, a general purpose PCIe switch includes all of these advanced functions in every implementation. General purpose PCIe switches also include full crossbar routing of any inputs to any outputs. These advanced functions may include Non-Transparent Bridge (NTB) units, support for any to any PCIe frame switching, multiple root port interfaces, support for multicasting PCIe frames to all PCIe ports, and support for varying the size (number of PCIe lanes) of each PCIe port. Such feature-rich PCIe switches drive complexity, higher operational power consumption, and greater cost. Furthermore, the complexity, power consumption and cost increase further with an increasing number of PCIe ports that are included in the switch.

BRIEF SUMMARY

One embodiment of the present invention provides an apparatus comprising a root port for coupling to a root complex via a serial computer expansion bus, and a plurality of endpoint ports, each endpoint port for coupling to an endpoint device via a serial communication link, wherein each endpoint port is associated with a function number. The apparatus further comprises a downstream buffer disposed in a first communication pathway from a downstream output of the root port to each of the endpoint ports, wherein the downstream buffer queues transaction layer packets received from a downstream output of the root port, wherein a function number is identified from each transaction layer packet in the downstream buffer, and wherein each transaction layer packet in the downstream buffer is directed to a downstream input of an endpoint port associated with the identified function number. Still further, the apparatus comprises an upstream buffer disposed in a second communication pathway from an upstream output of each of the endpoint ports to an upstream input the root port, wherein the upstream buffer queues transaction layer packets received from an upstream output of each endpoint port, and wherein the transaction layer packets in the upstream buffer are directed to an upstream input of the root port.

Another embodiment of the present invention provides a method comprising associating a function number with each of a plurality of endpoint ports of a switch, wherein each endpoint port is adapted for coupling to an endpoint device via a serial communication link. The method further comprises receiving a first transaction layer packet from a root complex, identifying a function number within the first transaction layer packet, and directing the first transaction layer packet to an endpoint device through the endpoint port that is associated with the identified function number.

DETAILED DESCRIPTION

Figure 1:
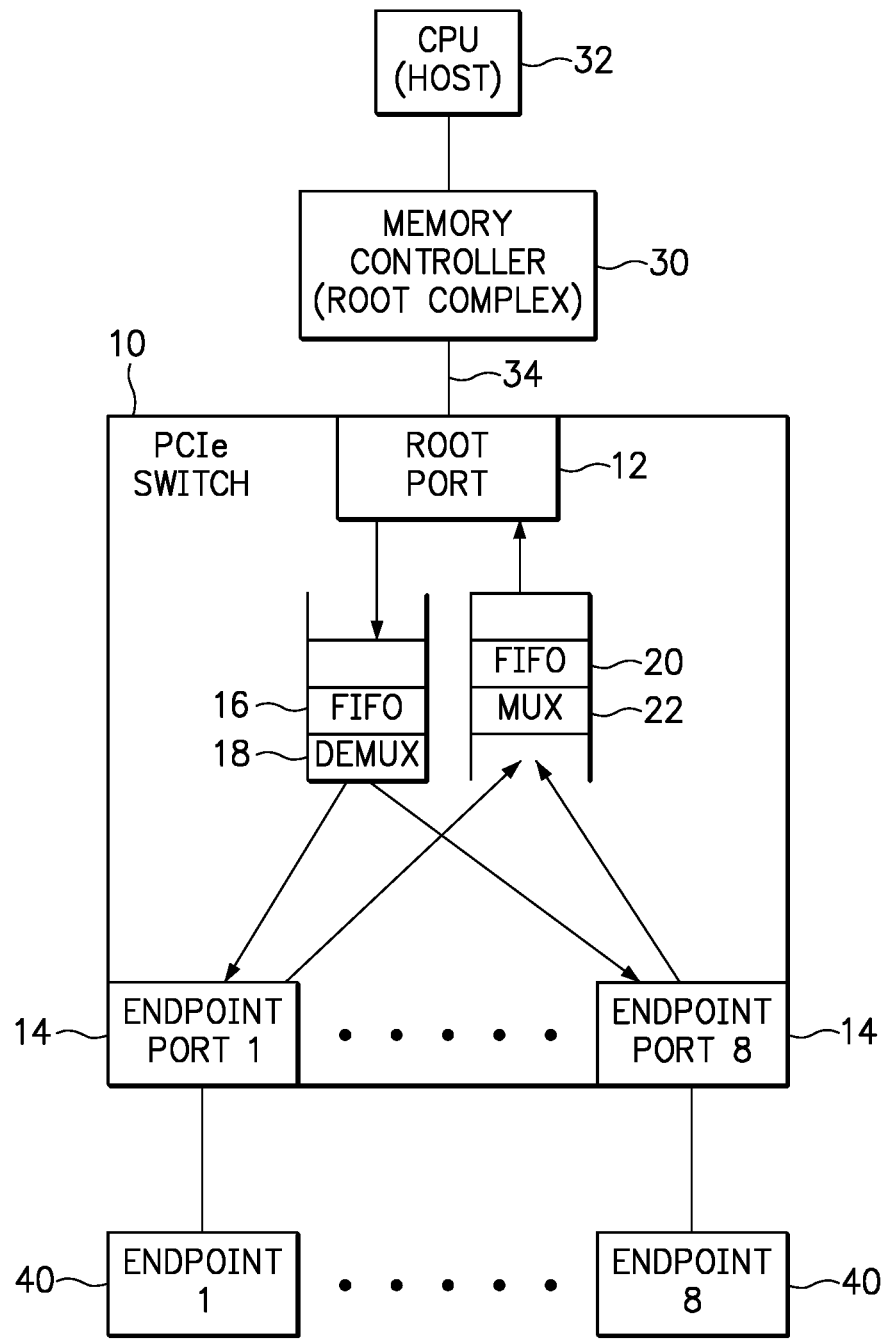
FIG. 1 is a diagram of a PCIe switch according to one embodiment of the present invention.

One embodiment of the present invention provides an apparatus comprising a root port for coupling to a root complex via a serial computer expansion bus, and a plurality of endpoint ports, each endpoint port for coupling to an endpoint device via a serial communication link, wherein each endpoint port is associated with a function number. The apparatus further comprises a downstream buffer disposed in a first communication pathway from a downstream output of the root port to each of the endpoint ports, wherein the downstream buffer queues transaction layer packets received from a downstream output of the root port, wherein a function number is identified from each transaction layer packet in the downstream buffer, and wherein each transaction layer packet in the downstream buffer is directed to a downstream input of an endpoint port associated with the identified function number. Still further, the apparatus comprises an upstream buffer disposed in a second communication pathway from an upstream output of each of the endpoint ports to an upstream input the root port, wherein the upstream buffer queues transaction layer packets received from an upstream output of each endpoint port, and wherein the transaction layer packets in the upstream buffer are directed to an upstream input of the root port.

The serial computer expansion bus is preferably implemented using a Peripheral Component Interconnect Express (PCIe) standard, but may be implemented using other standards now in existence, such as InfiniBand (IB), or standards developed in the future. The root complex connects a host central processing unit (CPU) and system memory to the PCIe switch. One example of a root complex is a memory controller, which may be either on a separate microchip or the same microchip as the CPU.

The root port, plurality of endpoint ports, upstream buffer and downstream buffer are preferably compliant with a layered protocol, such as PCIe. The root port preferably manages a data link layer and a physical layer of the layered protocol for serial communication with the root complex, and each endpoint port preferably manages the data link layer and the physical layer of the layered protocol for serial communication with the endpoint device connected to the endpoint port.

The apparatus may further comprise a demultiplexer having a demultiplexer input in communication with a head of the downstream buffer and a plurality of demultiplexer outputs, wherein each demultiplexer output is in communication with a downstream input of one of the endpoint ports. For example, the demultiplexer input may receive a transaction layer packet and a function number associated with that transaction layer packet, then use the function number as a selection input to direct the transaction layer packet to the endpoint port associated with that function number.

The apparatus may also comprise a multiplexer having a multiplexer output to a tail of the upstream buffer and a plurality of multiplexer inputs, wherein each multiplexer input is in communication with an upstream output of one of the endpoint ports. Since each endpoint port directs transaction layer packets to the same root complex, and only to the root complex, the function number is passed along to the upstream buffer within the transaction layer packet but is not used by the multiplexer. Rather, the multiplexer merely queues the transaction layer packets from each endpoint port in the upstream buffer for delivery to the root port.

The apparatus may further comprise a plurality of endpoint devices, wherein each endpoint device is coupled to an endpoint port by a serial communication link. Optionally, each serial communication link from an endpoint port to an endpoint device may have the same number of lanes. The apparatus preferably does not provide for communication between the plurality of endpoint devices. The endpoint devices are physical devices that add functionality or capacity to a computer system. Non-limiting examples of an endpoint device include a graphics adapter, a network adapter, and a data storage device. Optionally, the endpoint devices connected to the endpoint ports may include a variety of device types, or the endpoint devices may all be the same device type. For example, the apparatus may be suitable for connecting to a large array of data storage devices.

Still further, the apparatus may further comprise a memory controller coupled to the root port by a serial communication link. The memory controller preferably stores endpoint data associating a function number with each endpoint device. Optionally, the memory controller may store the endpoint data in any suitable data structure, such as a table, list, or database. The data structure may store endpoint data for each endpoint in a separate record, such that fields of data within a given record may be referred to as being "associated". For example, an endpoint and an associated function number may be stored in the same record of the endpoint data. The association between an endpoint and a function number as reflected in the endpoint data stored by the memory controller (i.e., root complex) will mirror the physical connection between the downstream buffer and each endpoint port. In one implementation, a demultiplexer establishes this association according to which endpoint port receives output as a function of the function number used as selection input.

In a further embodiment, the apparatus may be adapted to aggregate an even larger number of endpoint devices by increasing the number of endpoint ports. For example, if the function number is limited to a three bit number then the apparatus will only support eight endpoint ports. However, embodiments may combine the function number with a device number to increase the number of endpoint ports that can be addressed. Both the function number and the device number may be sub-portions of the Requester ID field of a transaction layer packet. One specific implementation may then separate the plurality of endpoint ports into groups, wherein each group of endpoint ports is associated with a device number which may be identified from a transaction layer packet, and wherein each transaction layer packet is directed to a downstream buffer for the group of endpoint ports associated with the identified device number. Accordingly, each group of endpoint ports may have its own downstream buffer and a demultiplexer that directs the transaction layer packet to an endpoint port within the group based on the function number as previously described. It should be understood that the device number may be considered to merely increase the number of bits used in addressing an endpoint port beyond a bit limit of the function number.

Optionally, each endpoint port may, for each transaction layer packet received from the downstream buffer, set the function number identified from the transaction layer packet to a value of zero prior to directing the transaction layer packet to an endpoint device connected to the endpoint port. Accordingly, the endpoint device will be able to determine that the transaction layer packet came from the root complex, and that any response to the transaction layer packet should be directed back to the root complex.

In a closely related option, each endpoint port may, for each transaction layer packet received from an endpoint device connected to the endpoint port, set the function number in the transaction layer packet to a value of the function number of the endpoint port prior to posting the transaction layer packet to the upstream buffer. Accordingly, when the root complex receives the transaction layer packet, the root complex will be able to determine the endpoint port from which the transaction layer packet was sent. This determination may be used by the root port in matching a TLP response to a previously sent TLP request.

Another embodiment of the present invention provides a method comprising associating a function number with each of a plurality of endpoint ports of a switch, wherein each endpoint port is adapted for coupling to an endpoint device via a serial communication link. The method further comprises receiving a first transaction layer packet from a root complex, identifying a function number within the first transaction layer packet, and directing the first transaction layer packet to an endpoint device through the endpoint port that is associated with the identified function number.

The method may further comprise advertising the available function numbers to the root complex, and the root complex storing endpoint data identifying, for each of the plurality of endpoint ports, the associated function number. Additional endpoint data may also be advertised to the root complex and/or stored by the root complex. Optionally, the additional endpoint data may include the capabilities of the endpoint device that is coupled to each endpoint port.

The method may also comprise, prior to providing the first transaction layer packet to an endpoint device, setting the function number in the first transaction layer packet equal to zero.

In another option, the method may further comprise the endpoint port that is associated with the identified function number building a layered protocol frame including the first transaction layer packet, wherein the first transaction layer packet is sent to the endpoint device in the layered protocol frame. Still further, a root port that is connected to the root complex may build a layered protocol frame including the second transaction layer packet, wherein the second transaction layer packet is sent to the root complex in a layered protocol frame.

In yet another option, the plurality of endpoint ports may be separated into groups, and the method may further comprise associating each group of endpoint ports with a device number, identifying a device number within the first transaction layer packet, and directing the first transaction layer packet to the group of endpoint ports associated with the identified device number.

The method may further comprise receiving a second transaction layer packet from an endpoint device connected to one of the endpoint ports, and directing the second transaction layer packet to the root complex, wherein any transaction layer packet received from an endpoint device is directed to the root complex. Optionally, the method my further comprise, prior to providing the second transaction layer packet to the root complex, setting a function number in the second transaction layer packet equal to the function number associated with the endpoint port that received the second transaction layer packet.

FIG. 1 is a diagram of an apparatus 10 according to one embodiment of the present invention. The apparatus 10 includes a root port 12 and a plurality of endpoint ports 14. In the embodiment shown in the Figures, the apparatus 10 may be referred to as a PCIe Switch and both the root port 12 and endpoint ports 14 may be referred to as PCIe ports or interfaces. However, it should be recognized that the present invention is not limited to a particular layered protocol standard.

The PCIe switch 10 further includes a downstream FIFO (first in, first out) queue or buffer 16 that receives PCIe transaction layer packets (TLPs) from a root complex. The TLPs are pulled from the head of the buffer 16 for handling by a demultiplexer 18. Specifically, the demultiplexer 18 uses a function number associated with each TLP as a selection input that determines which of the endpoint ports 14 will receive the TLP. For example, if the function number is a three bit number, then those three bits can uniquely identify eight (8) different endpoint ports. Accordingly, the demultiplexer 18 may have one input coupled to the buffer 16, a three bit selection input for receiving the function number, and eight separate outputs, wherein each of the outputs are coupled to one of the endpoint ports 14.

The PCIe switch 10 further includes multiplexer 22 having inputs coupled to each endpoint port 14 and an output coupled to an upstream FIFO queue or buffer 20 containing PCIe TLP entries received from the endpoint ports. In the example shown, the multiplexer 22 has eight (8) inputs coupled to one of the eight respective endpoint ports 14. Optionally, the multiplexer 22 merely passes all of the TLPs received from the endpoint ports 14 regardless of the order of receipt or content of the TLP.

The PCIe switch 10 is shown in use between a memory controller 30 and a plurality of endpoint devices 40. The memory controller 30 serves as a root complex, and a CPU 32 serves as a host that generates requests to the memory controller 30. The memory controller 30 translates those requests onto a serial expansion bus 34, such as a PCIe expansion bus. For example, the memory controller 30 may send a PCIe frame to the root port 12. The PCIe frame will include a transaction layer packet (TLP) that includes a function number that will select the endpoint port 14 to which the demultiplexer 18 will direct the TLP.

Figure 2:
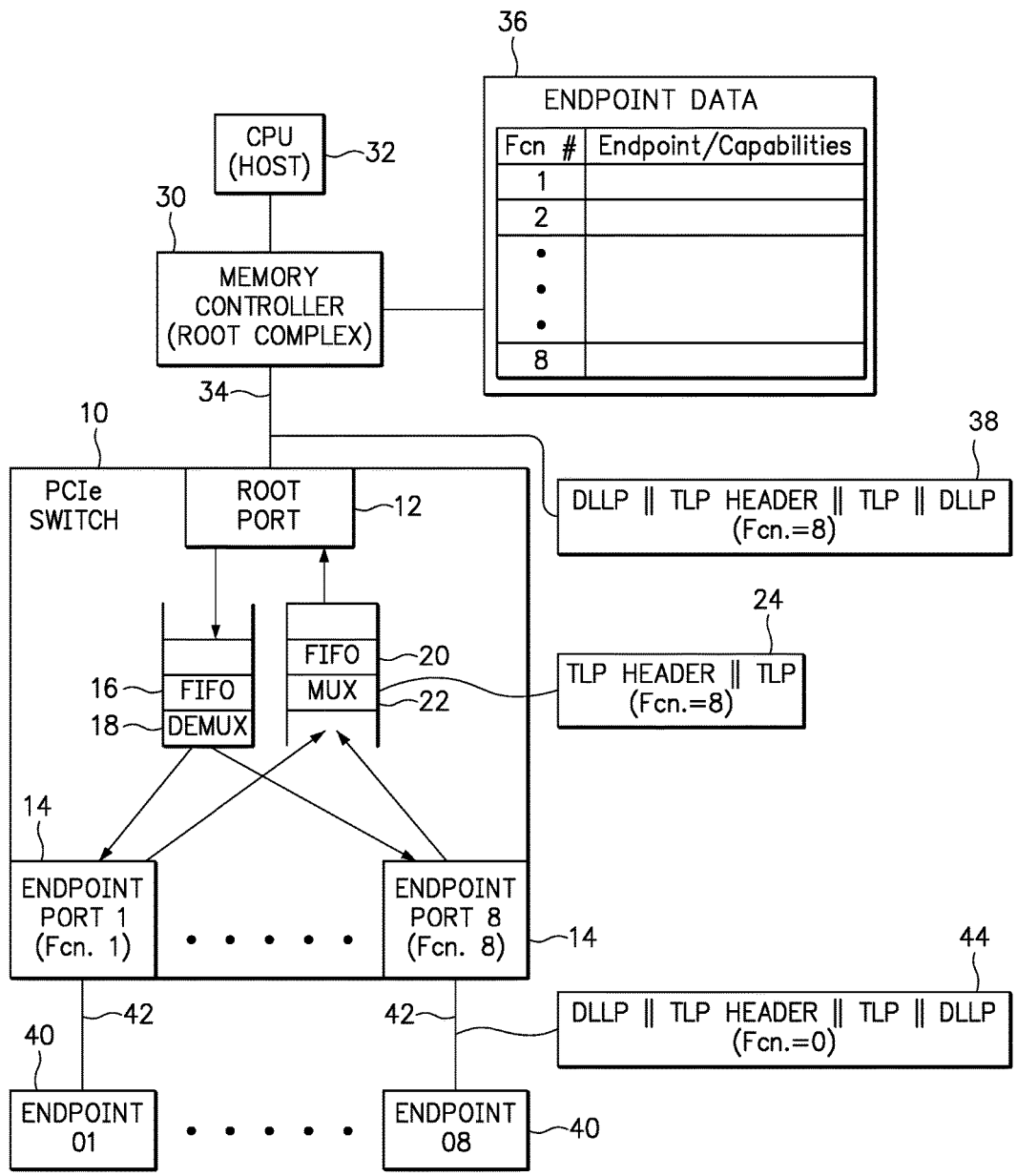
FIG. 2 is a diagram of the PCIe switch of FIG. 1, but illustrating various aspects of the data flow according to an embodiment of the present invention.

FIG. 2 is a diagram of the PCIe switch 10 of FIG. 1, but illustrating various aspects of the data flow according to an embodiment of the present invention. The memory controller 30 is shown storing endpoint data 36, the serial expansion bus 34 is shown communicating a PCIe frame 38, a TLP 24 illustrates a hypothetical format of data passing through the PCIe switch 10, and a serial link 42 is shown communicating a PCIe frame 44. This data flow and the content of the data will be discussed below.

Initially, the PCIe switch 10 advertises a number of functions to the root complex. In this example, the PCIe switch 10 has eight (8) endpoint ports 14 and advertises this fact to the root complex 30. Accordingly, the root complex 30 may perform a bus enumeration to determine which of the eight endpoint ports 14 (i.e., identified by the eight function numbers) are connected (i.e., associated) to an endpoint device 40. For example, the root complex may send a PCIe frame to each of the advertised functions requesting a response. Each endpoint device 40 may then respond with a PCIe frame that identifies the endpoint and its capabilities. The root complex 30 stores this endpoint data 36 received from each endpoint, for example in a data structure such as a table or list including a record for each endpoint device. For each endpoint device, the record may store the endpoint capabilities identified in the response, as well as the function number that was used to access the particular endpoint device. Accordingly, the root complex 30 may use the endpoint data 36 to determine a function number that should be used in a PCIe frame in order to reach an endpoint device having a desired capability.

Embodiments of the present invention may use the function number as an endpoint address. A PCIe TLP typically includes a Requester ID that identifies the address of a device that is requesting a Completer to take some action. According to the present invention, the PCIe switch 10 does not support communication from one endpoint device 40 to another endpoint device, such that the root complex 30 (having address "0") is the only Requester. Therefore, the 16-bit Requester ID field of the PCIe frame is not needed by the PCIe switch 10 for the purpose of identifying the Requester and may be repurposed to identify a function number associated with an endpoint port 14. The 16-bit Requester address typically includes an eight-bit bus number, a five-bit device number and a three-bit function number (also referred to as the bus/device/function address or "BDF"). The root complex 30 may insert an endpoint port number in the 3-bit function number field of the Requester ID of a PCIe frame 38, and the PCIe switch implements logic, either in hardware or software, to direct the TLP within the PCIe frame to a given endpoint that is uniquely associated with the function number. As an example, the TLP includes a function number of "8" (i.e., "Fcn.=8") indicating that the root complex is sending the TLP to endpoint port 8. In this example, the PCie frame may have the following format: DLLP||TLP||Payload||DLLP. It should be recognized that the term "function number", as used herein, is not limited to a 3-bit number and is not limited to the size of a function number portion of a Requester ID field. In fact, the entire 16-bit Request ID could be repurposed as a function number (and/or device number) consistent with embodiments of the present invention.

The root port 12 manages the link with the root complex 30 by managing the Data Link Layer Packet (DLLP) Layer and Physical Layer with the root complex and presenting each endpoint as a PCIe function. Upon receiving a PCIe frame from the root complex 30, the root port 12 will parse the PCIe frame 38 to extract the TLP header and the TLP. The root port 12 will then post the TLP Header and the TLP onto the tail of the downstream buffer (FIFO) 16.

The TLPs are pulled from the head of the downstream buffer 16 for handling by a demultiplexer 18. Specifically, the demultiplexer 18 uses the function number associated with each TLP as a selection input that determines which of the endpoint ports 14 will receive the TLP. For example, if the function number is a three bit number, then those three bits can uniquely identify eight (8) different endpoint ports.

Accordingly, the demultiplexer 18 may have one input coupled to the downstream buffer 16, a three bit selection input for receiving the three-bit function number, and eight separate outputs, wherein each of the outputs are coupled to one of the endpoint ports 14. In this example, since the root complex 30 sent a PCIe frame 38 with a function number of eight (8), the demultiplexer 18 will direct the TLP Header and TLP 24 with "Fcn.=8", taken from the frame 38, to Endpoint Port 8.

The endpoint port 14 manages the DLLP Layer and Physical Layer with the endpoint device 40. Endpoint Port 8 will then set the function number in the TLP header to a value of "0" ("Fcn.=0") when building a PCIe frame 44 including the TLP. The PCIe frame 44 is then sent to the connected endpoint device 40 ("Endpoint 08"). Since the PCIe frame 44 received by the endpoint device 40 has a Requester ID of "0" (i.e., by setting the function number to a value of "0"), the endpoint device 40 determines that the PCIe frame was sent from the root complex 30.

If the endpoint device 40 generates a response or other communication to the root complex 30, the endpoint device 40 will send a PCIe frame (as represented by the PCIe frame 44) to the associated endpoint port 14. Upon receiving a PCIe frame from an attached endpoint device 40, the endpoint port 14 will parse the PCIe frame to extract the TLP header and the TLP. Furthermore, the endpoint port 14 will also update the function number included in the TLP header of the PCIe frame, wherein the function number (i.e., "Fcn.=8") identifies the endpoint port that is connected to the endpoint device 40 that generated the PCIe frame. The endpoint port 14 then posts the TLP Header and the TLP (as represented by the TLP Header/TLP 24) onto the tail of the upstream buffer (FIFO) 20 via the multiplexer 22.

Eventually, the root port 12 will pull the TLP Header and the TLP from the head of the upstream buffer 20, and will build a PCIe frame (as represented by PCIe frame 38) that is sent to the root complex 30. The root complex 30 may use the function number (i.e., "Fcn.=8") included in the received PCIe frame 38 to determine that the PCIe frame is part of an ongoing communication with a particular endpoint device 40. For example, the root complex may receive a PCIe frame from an endpoint that is a response to a request that the root previously sent to the endpoint. Endpoint devices connected to the PCIe switch of the present invention may be considered to be private endpoints that are not available to other hosts or other endpoints. Furthermore, each endpoint device views the PCIe switch as a root complex, since the endpoint can communicate only through the PCIe switch.

Figure 3:
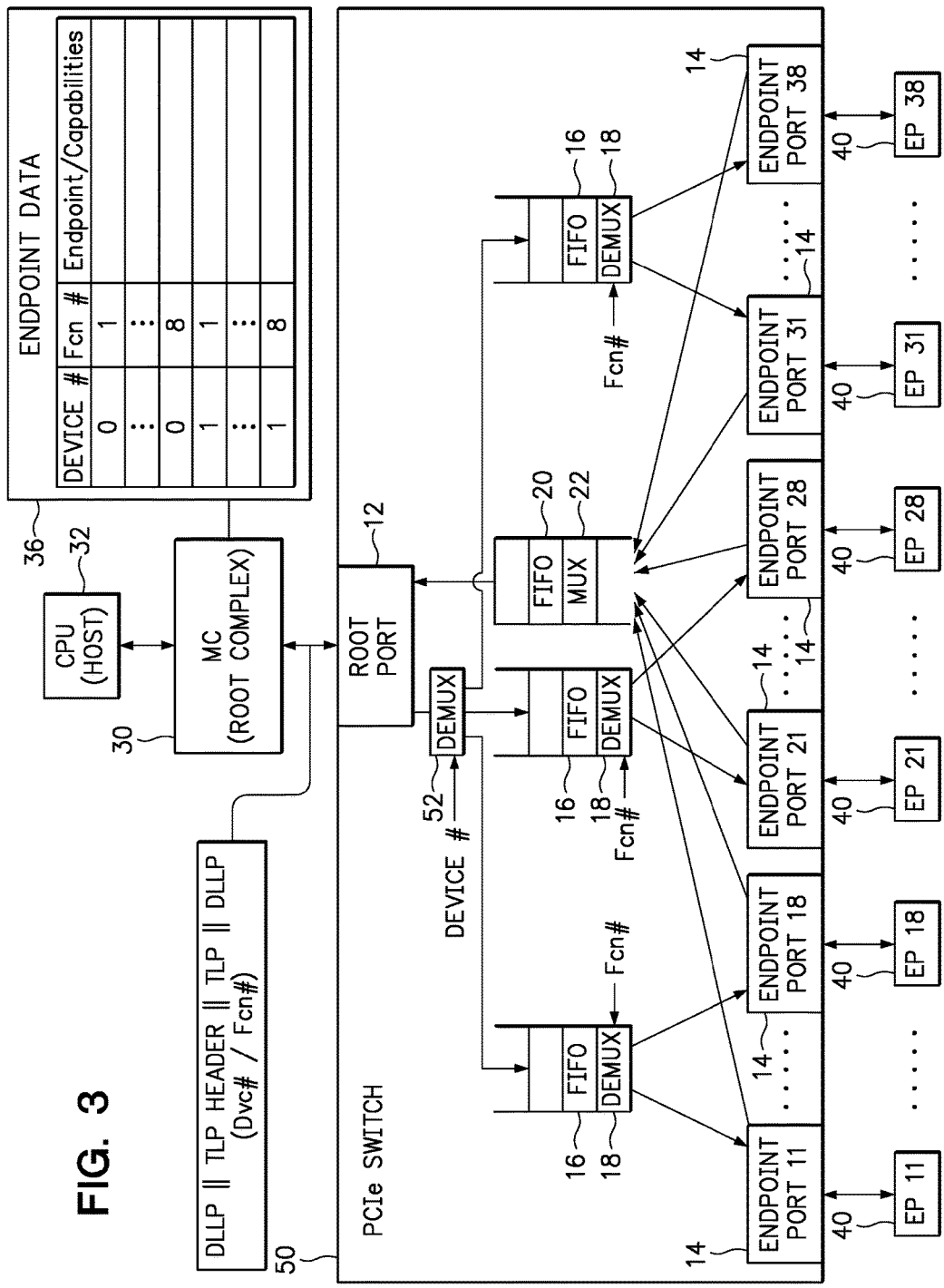
FIG. 3 is a diagram of a PCIe switch having twenty-four (24) links for coupling to twenty-four (24) endpoint devices.

FIG. 3 is a diagram of a PCIe switch 50 having twenty-four (24) endpoint ports for coupling to twenty-four (24) endpoint devices. It should be recognized that the quantity 24 is neither a minimum nor a maximum of endpoint ports that may be provided by a PCIe switch according to the present invention.

The PCIe switch 50 operates in substantially the same manner as the PCIe switch 10 of FIGS. 1 and 2, except for modifications to aggregate a greater number of endpoint devices 40. Specifically, the plurality of endpoint ports 14 are separated into groups (i.e., three groups in this example). Each group of endpoint ports is associated with a device number, which may be a binary number such as a two bit code. If the root complex 30 stores the device number in the endpoint data 36, PCIe frames may be sent including the TLP as well as a device number and a function number. The term "device number" is used in reference to the Requester ID of a TLP, wherein a 16 bit Requester ID may include an 8 bit bus number, a 5 bit device number and a 3 bit function number. In the present invention, the Requester ID "device number" is repurposed, for example wherein 2 bits of a device number are identified within a TLP and used as a selection input to a demultiplexer 52 that directs the TLP to a particular downstream buffer 16 for a given group of endpoint ports 14 associated with the identified device number. As used in FIG. 3, the endpoint ports 14 and the endpoint devices 40 are labeled with a two digit number, wherein the first digit is an endpoint group ID (device number) and the second digit is an endpoint port/device ID (function number). Accordingly, the twenty-four (24) endpoint devices 40 are labeled as EP11-EP18, EP21-EP28 and EP31-EP38. EP11 . . . EP18 refers to endpoint group 1, endpoint port/device 1 through 8; EP21 . . . EP28 refers to endpoint group 2, endpoint port/device 1 through 8; and EP31 . . . EP38 refers to endpoint group 3, endpoint port/device 1 through 8.

Figure 4:
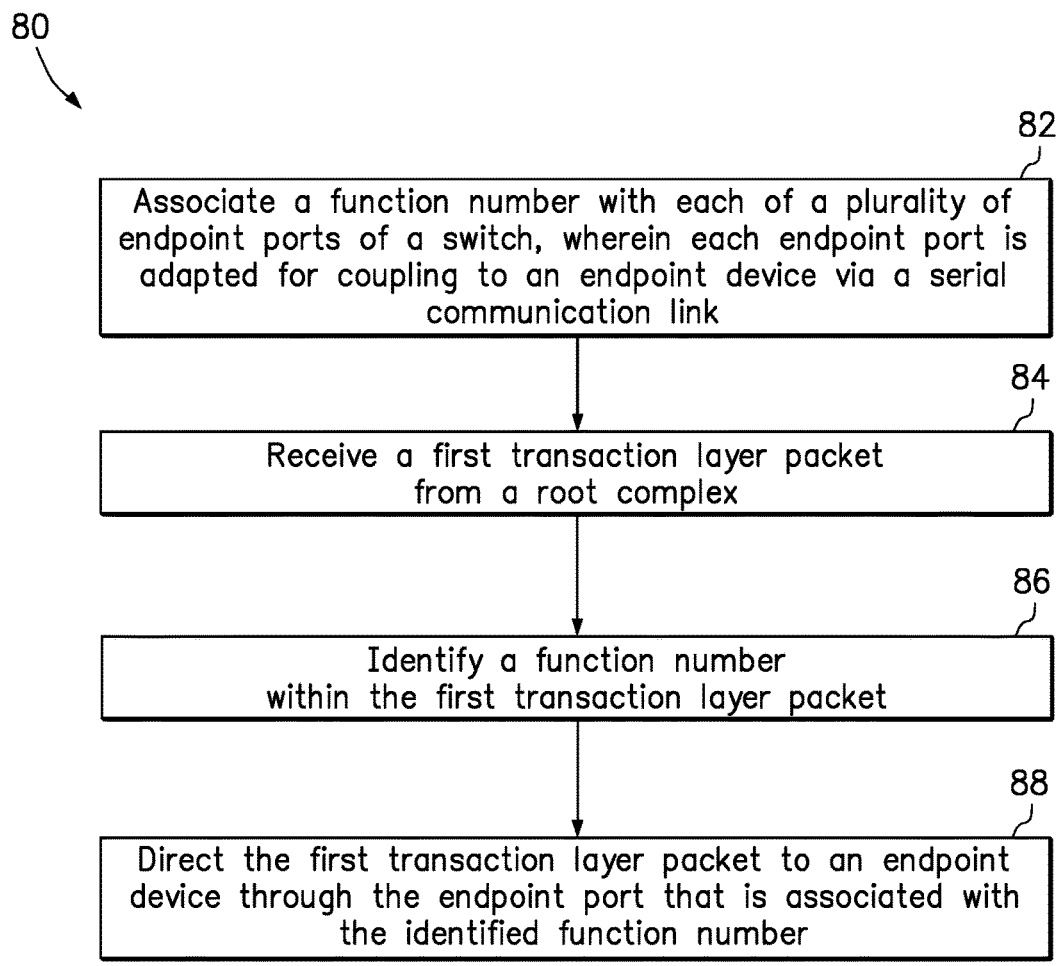
FIG. 4 is a flowchart of a method according to one embodiment of the present invention.

FIG. 4 is a flowchart of a method 80 according to one embodiment of the present invention. In step 82, the method associates a function number with each of a plurality of endpoint ports of a switch, wherein each endpoint port is adapted for coupling to an endpoint device via a serial communication link. In step 84, the method receives a first transaction layer packet from a root complex. Step 86 identifies a function number within the first transaction layer packet. Then, in step 88, the method directs the first transaction layer packet to an endpoint device through the endpoint port that is associated with the identified function number.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
    a root port for coupling to a root complex via a serial computer expansion bus;
    a plurality of endpoint ports, each endpoint port for coupling to an endpoint device via a serial communication link, wherein each endpoint port is associated with a function number;
    a downstream buffer disposed in a first communication pathway from a downstream output of the root port to each of the endpoint ports, wherein the downstream buffer queues transaction layer packets received from the downstream output of the root port, wherein a function number is identified from each transaction layer packet in the downstream buffer, and wherein each transaction layer packet in the downstream buffer is directed to a downstream input of one of the endpoint ports associated with the identified function number;
    a demultiplexer having a demultiplexer input in communication with a head of the downstream buffer and a plurality of demultiplexer outputs, wherein each demultiplexer output is in communication with a downstream input of one of the endpoint ports;
    an upstream buffer disposed in a second communication pathway from an upstream output of each of the endpoint ports to an upstream input of the root port, wherein the upstream buffer queues transaction layer packets received from the upstream output of each endpoint port, and wherein the transaction layer packets in the upstream buffer are directed to the upstream input of the root port; and a multiplexer having a multiplexer output to a tail of the upstream buffer and a plurality of multiplexer inputs, wherein each multiplexer input is in communication with an upstream output of one of the endpoint ports.

2. The apparatus of claim 1, further comprising:
a plurality of endpoint devices, each endpoint device coupled to an endpoint port by a serial communication link.

3. The apparatus of claim 2, wherein each serial communication link from an endpoint port to an endpoint device has the same number of lanes.

4. The apparatus of claim 2, wherein the plurality of endpoint devices are unable to communicate with each other.

5. The apparatus of claim 2, further comprising:
a memory controller coupled to the root port by a serial communication link.

6. The apparatus of claim 5, wherein the memory controller stores endpoint data associating a function number with each endpoint device.

7. The apparatus of claim 1, wherein the plurality of endpoint ports are separated into groups, wherein each group of endpoint ports is associated with a device number, and wherein a device number is identified from a transaction layer packet, and wherein each transaction layer packet is directed to a downstream buffer for the group of endpoint ports associated with the identified device number.

8. The apparatus of claim 1, wherein each endpoint port, for each transaction layer packet received from the downstream buffer, sets the function number identified from the transaction layer packet to a value of zero prior to directing the transaction layer packet to an endpoint device connected to the endpoint port.

9. The apparatus of claim 1, wherein each endpoint port, for each transaction layer packet received from an endpoint device connected to the endpoint port, sets the function number in the transaction layer packet to a value of the function number of the endpoint port prior to posting the transaction layer packet to the upstream buffer.

10. The apparatus of claim 1, wherein the root port, the plurality of endpoint ports, the upstream buffer and the downstream buffer are compliant with a layered protocol.

11. The apparatus of claim 10, wherein the root port manages a data link layer and a physical layer of the layered protocol for serial communication with the root complex, and wherein each endpoint port manages the data link layer and the physical layer of the layered protocol for serial communication with the endpoint device connected to the endpoint port.

12. An apparatus, comprising:
a root port for coupling to a root complex via a serial computer expansion bus;
a plurality of endpoint ports, each endpoint port for coupling to an endpoint device via a serial communication link, wherein each endpoint port is associated with a function number;
a downstream buffer disposed in a first communication pathway from a downstream output of the root port to each of the endpoint ports, wherein the downstream buffer queues transaction layer packets received from the downstream output of the root port, wherein a function number is identified from each transaction layer packet in the downstream buffer, and wherein each transaction layer packet in the downstream buffer is directed to a downstream input of one of the endpoint ports associated with the identified function number; and
an upstream buffer disposed in a second communication pathway from an upstream output of each of the endpoint ports to an upstream input of the root port, wherein the upstream buffer queues transaction layer packets received from the upstream output of each endpoint port, and wherein the transaction layer packets in the upstream buffer are directed to the upstream input of the root port, wherein each endpoint port, for each transaction layer packet received from an endpoint device connected to the endpoint port, sets the function number in the transaction layer packet to a value of the function number of the endpoint port prior to posting the transaction layer packet to the upstream buffer.

13. The apparatus of claim 1, further comprising:
a plurality of endpoint devices, each endpoint device coupled to an endpoint port by a serial communication link.

14. The apparatus of claim 13, further comprising:
a memory controller coupled to the root port by a serial communication link.

15. The apparatus of claim 14, wherein the memory controller stores endpoint data associating a function number with each endpoint device.

16. The apparatus of claim 12, wherein the plurality of endpoint ports are separated into groups, wherein each group of endpoint ports is associated with a device number, and wherein a device number is identified from a transaction layer packet, and wherein each transaction layer packet is directed to a downstream buffer for the group of endpoint ports associated with the identified device number.

17. The apparatus of claim 12, wherein each endpoint port, for each transaction layer packet received from the downstream buffer, sets the function number identified from the transaction layer packet to a value of zero prior to directing the transaction layer packet to an endpoint device connected to the endpoint port.

18. The apparatus of claim 12, wherein the root port, the plurality of endpoint ports, the upstream buffer and the downstream buffer are compliant with a layered protocol.

19. The apparatus of claim 18, wherein the root port manages a data link layer and a physical layer of the layered protocol for serial communication with the root complex, and wherein each endpoint port manages the data link layer and the physical layer of the layered protocol for serial communication with the endpoint device connected to the endpoint port.

20. An apparatus, comprising:
a root port for coupling to a root complex via a serial computer expansion bus;
a plurality of endpoint ports, each endpoint port for coupling to an endpoint device via a serial communication link, wherein each endpoint port is associated with a function number;
a downstream buffer disposed in a first communication pathway from a downstream output of the root port to each of the endpoint ports, wherein the downstream buffer queues transaction layer packets received from the downstream output of the root port, wherein a function number is identified from each transaction layer packet in the downstream buffer, and wherein each transaction layer packet in the downstream buffer is directed to a downstream input of one of the endpoint ports associated with the identified function number; and
an upstream buffer disposed in a second communication pathway from an upstream output of each of the endpoint ports to an upstream input of the root port, wherein the upstream buffer queues transaction layer packets received from the upstream output of each endpoint port, and wherein the transaction layer packets in the upstream buffer are directed to the upstream input of the root port, wherein the root port, the plurality of endpoint ports, the upstream buffer and the downstream buffer are compliant with a layered protocol, wherein the root port manages a data link layer and a physical layer of the layered protocol for serial communication with the root complex, and wherein each endpoint port manages the data link layer and the physical layer of the layered protocol for serial communication with the endpoint device connected to the endpoint port.

\* \* \* \* \*